United States Patent
Jaradi et al.

(10) Patent No.: US 12,156,506 B2
(45) Date of Patent: Dec. 3, 2024

(54) INFLATABLE HARNESS ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 65 days.

(21) Appl. No.: 18/194,868

(22) Filed: Apr. 3, 2023

(65) Prior Publication Data
US 2024/0324547 A1    Oct. 3, 2024

(51) Int. Cl.
*B60R 22/10* (2006.01)
*A01K 1/02* (2006.01)

(52) U.S. Cl.
CPC ............ *A01K 1/0272* (2013.01); *B60R 22/10* (2013.01)

(58) Field of Classification Search
CPC ..... A01K 1/0272; B60R 22/10; A41D 13/018
See application file for complete search history.

(56) References Cited

U.S. PATENT DOCUMENTS

| | | | |
|---|---|---|---|
| 4,059,852 A * | 11/1977 | Crane | A41D 13/018 2/456 |
| 4,453,271 A * | 6/1984 | Donzis | A41D 13/0153 2/2.5 |
| 4,496,328 A * | 1/1985 | Asher | B63C 9/1255 441/115 |
| 5,292,175 A * | 3/1994 | Artz | B60N 2/2806 297/452.41 |
| 5,781,936 A * | 7/1998 | Alaloof | A41D 13/018 2/456 |
| 6,378,898 B1 | 4/2002 | Lewis et al. | |
| 6,419,263 B1 | 7/2002 | Busgen et al. | |
| 6,546,561 B2 * | 4/2003 | Duhamell | A41D 13/018 2/102 |
| 6,859,939 B1 * | 3/2005 | Osburn, Sr. | A41D 13/018 128/869 |

(Continued)

OTHER PUBLICATIONS

Britax Inflatable Seat Belt Policy, Britax Australia & New Zealand Inflat5able Seat Belt Policy for AS/NZSW 1754 (A U standard), FMVSS (US standard) or CMVSS (Canadian standard), Suitability of Britax child restraints with Inflatable Seatbelts, https://www.britax.com.au/service-support/inflatable-seat-belt-policy/.

(Continued)

*Primary Examiner* — Toan C To
(74) *Attorney, Agent, or Firm* — Frank A. MacKenzie; Bejin Bieneman PLC

(57) ABSTRACT

An assembly includes an inflatable harness having a first loop of webbing, a second loop of webbing, and a panel connecting the first loop of webbing to the second loop of webbing. The assembly includes an inflatable tether extending from the first loop of webbing, the inflatable tether in fluid communication with the inflatable harness. The assembly includes a latch plate fixed to the inflatable tether, the latch plate defining a fluid passage in fluid communication with the inflatable tether to provide inflation medium to the inflatable harness.

19 Claims, 5 Drawing Sheets

(56) References Cited

U.S. PATENT DOCUMENTS

| | | | |
|---|---|---|---|
| 7,401,364 B2* | 7/2008 | Goto | B62J 27/20 |
| | | | 2/102 |
| 7,571,931 B2 | 8/2009 | Watanabe | |
| 7,690,051 B2* | 4/2010 | Uchida | A62B 35/04 |
| | | | 2/69 |
| 8,851,514 B2 | 10/2014 | Renaudin et al. | |
| 2002/0092088 A1* | 7/2002 | Duhamell | A41D 13/018 |
| | | | 2/463 |
| 2002/0125701 A1 | 9/2002 | Devonport | |
| 2014/0042793 A1 | 2/2014 | Fiore | |
| 2014/0230135 A1* | 8/2014 | Fenyves | B60R 21/18 |
| | | | 2/455 |
| 2016/0000158 A1* | 1/2016 | Davis | A63B 69/18 |
| | | | 2/455 |
| 2018/0334078 A1* | 11/2018 | Wang | A01K 1/0272 |
| 2024/0081273 A1* | 3/2024 | Remien | A01K 1/0272 |

OTHER PUBLICATIONS

Ford Technology, Inflatable Rear Safety Belts, Copyright 2022 Ford Middle East.

* cited by examiner

INFLATABLE HARNESS ASSEMBLY

BACKGROUND

A vehicle may include one or more systems to control kinematics of an occupant of the vehicle during certain vehicle impacts. The occupant may be, for example, a dog or other animal. Systems to control kinematics of the animal may include, for example, an animal harness and seatbelt assembly.

DETAILED DESCRIPTION

Figure 1:
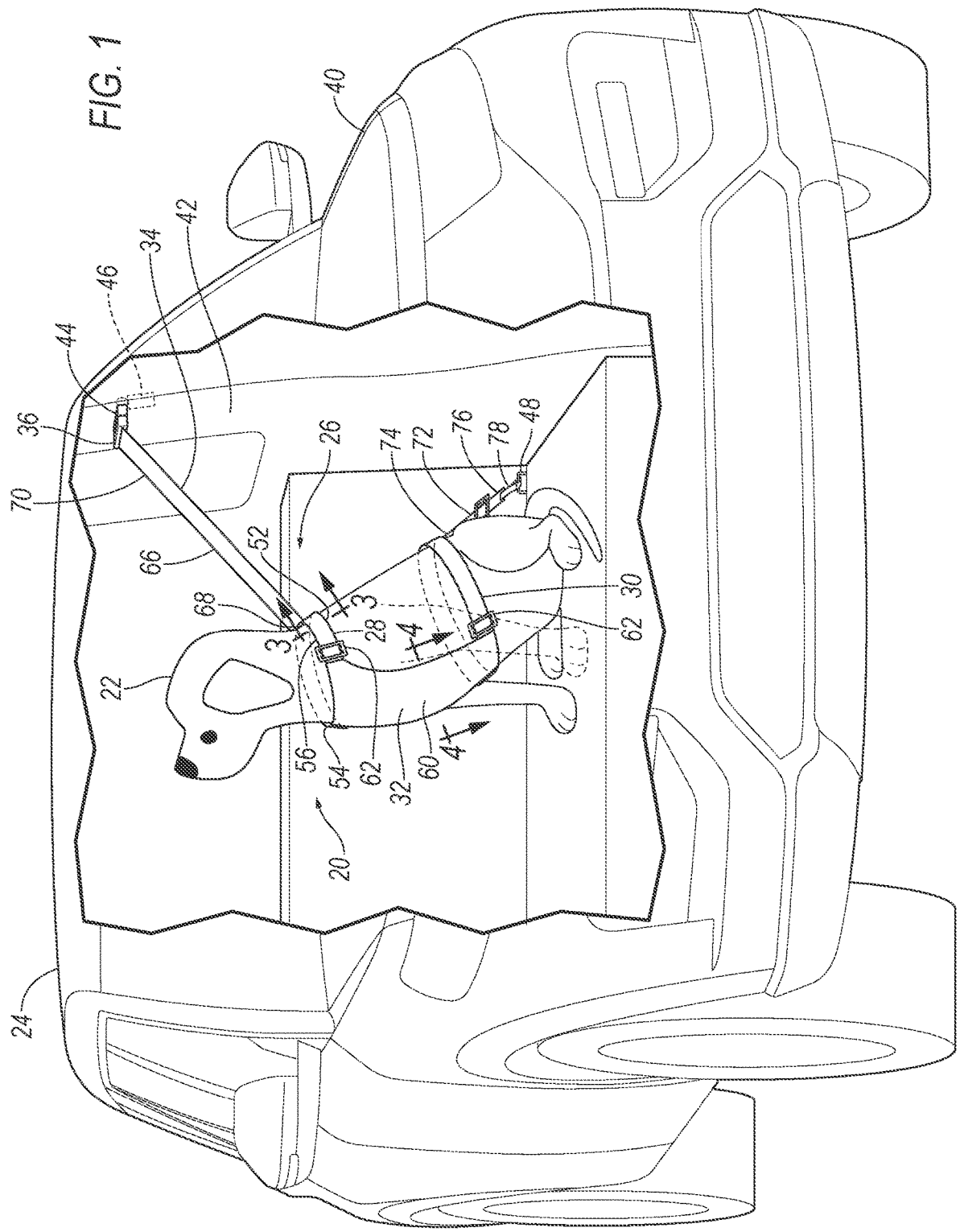
FIG. 1 is a perspective view a vehicle broken away to show an assembly for controlling kinematics of an animal in the vehicle.
Figure 2:
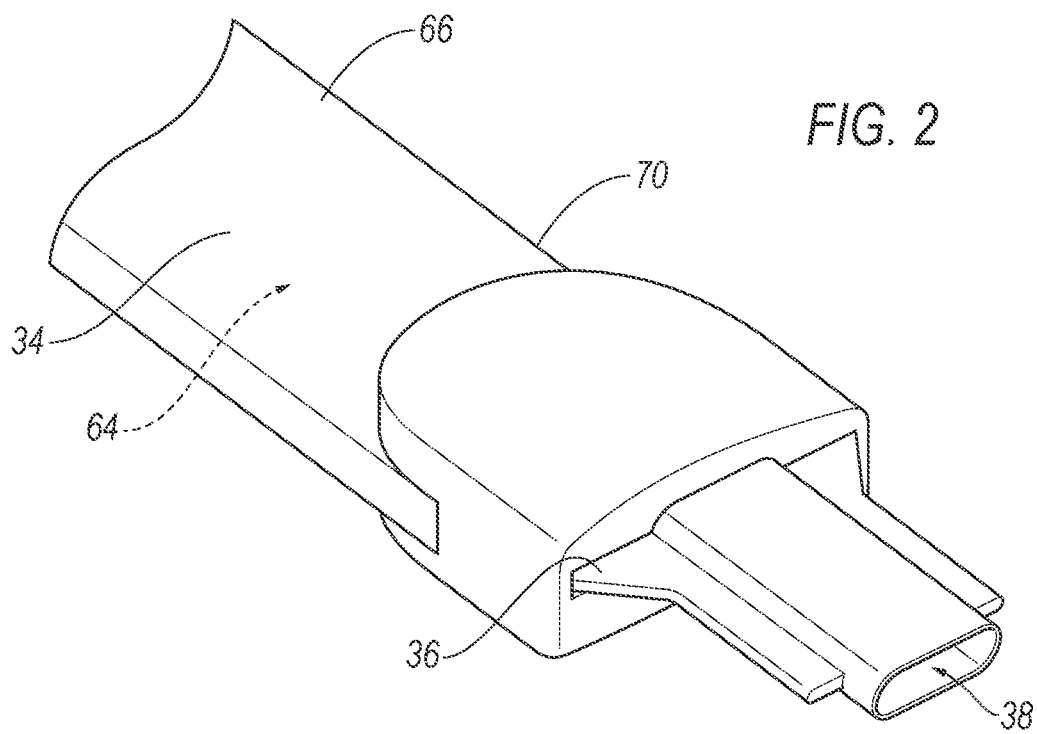
FIG. 2 is a perspective view of a latch plate and an inflatable tether of the assembly.

An assembly includes an inflatable harness. The inflatable harness has a first loop of webbing, a second loop of webbing, and a panel connecting the first loop of webbing to the second loop of webbing. The assembly includes an inflatable tether extending from the first loop of webbing. The inflatable tether is in fluid communication with the inflatable harness. The assembly includes a latch plate fixed to the inflatable tether. The latch plate defines a fluid passage in fluid communication with the inflatable tether to provide inflation medium to the inflatable harness.

The first loop of webbing may be inflatable.

The panel may be inflatable.

The first loop may be adjustable in size.

The second loop may be adjustable in size.

The assembly may include a second tether extending from the second loop.

The assembly may include a clip connected to the second tether.

The clip may be configured to engage an ISO-fix anchor.

An assembly includes a vehicle body. The assembly includes a buckle supported by the vehicle body. The assembly includes an inflator supported by the vehicle body. The assembly includes a latch plate engaged with the buckle, the latch plate defining a fluid passage, the fluid passage in fluid communication with the inflator to receive inflation medium. The assembly includes an inflatable harness having a first loop of webbing, a second loop of webbing, and a panel connecting the first loop of webbing to the second loop of webbing. The assembly includes an inflatable tether extending from the first loop of webbing, the latch plate fixed to the inflatable tether, the inflatable tether in fluid communication with the inflatable harness and the fluid passage of the latch plate to provide inflation medium to the inflatable harness from the fluid passage of the latch plate.

The vehicle body may include a pillar, and the buckle may be supported by the pillar.

The inflator may be supported by the pillar.

The inflator may be a cold gas inflator.

The first loop of webbing may be inflatable.

The panel may be inflatable.

The first loop may be adjustable in size.

The second loop may be adjustable in size.

The assembly may include a second tether extending from the second loop to a second distal end.

The assembly may include a clip connected to the second tether.

The assembly may include an ISO-fix anchor fixed to the vehicle body and the clip may be configured to engage the ISO-fix anchor.

With reference to the Figures, wherein like numerals indicate like parts throughout the several views, an assembly 20 for controlling kinematics of an animal 22 in a vehicle 24 is shown. The assembly 20 includes an inflatable harness 26 having a first loop of webbing 28, a second loop of webbing 30, and a panel 32 connecting the first loop of webbing 28 to the second loop of webbing 30. The assembly 20 includes an inflatable tether 34 extending from the first loop of webbing 28. The inflatable tether 34 is in fluid communication with the inflatable harness 26. The assembly 20 includes a latch plate 36 fixed to the inflatable tether 34. The latch plate 36 defines a fluid passage 38 in fluid communication with the inflatable tether 34 to provide inflation medium to the inflatable harness 26. The inflation medium may be provided to the fluid passage 38 after a certain impact to the vehicle 24 is detected. The inflation medium may inflate the inflatable harness 26 to an inflated position and control kinematics of the animal 22 wearing the inflatable harness 26.

The vehicle 24 may be any suitable type of ground vehicle, e.g., a passenger or commercial automobile such as a sedan, a coupe, a truck, a sport utility, a crossover, a van, a minivan, a taxi, a bus, etc.

The vehicle 24 includes a frame and a vehicle body 40. The frame and vehicle body 40 may be of a unibody construction in which the frame is unitary with the vehicle body 40 including frame rails, pillars 42, roof rails, etc. As another example, the vehicle body 40 and frame may have a body-on-frame construction also referred to as a cab-on-frame construction in which the vehicle body 40 and frame are separate components, i.e., are modular, and the vehicle body 40 is supported on and affixed to the frame. Alternatively, the frame and vehicle body 40 may have any suitable construction. The frame and vehicle body 40 may be of any suitable material, for example, steel, aluminum, and/or fiber-reinforced plastic, etc.

The vehicle body 40 may include one or more pillars 42. For example, the vehicle body 40 may include a front pillar and a middle pillar on each side of the vehicle 24. The front pillars may extend between a windshield and front doors for the vehicle. In other words, the front pillars may be disposed at a front end of a passenger compartment of the vehicle body 40. The middle pillars may extend behind the front doors, e.g., between adjacent doors. In other words, the middle pillars may be spaced from the front pillars by a front door opening. The vehicle 24 may include additional pillars 42, e.g., an additional middle pillar, a rear pillar. The pillars 42 may extend from the roof to a floor of the vehicle body 40.

A latch plate buckle 44 is supported by the vehicle body 40. The latch plate buckle 44 may be supported by one of the pillars 42. The latch plate buckle 44 may be fixed to the vehicle body 40, e.g., to one of the pillars 42, via fasteners or any suitable structure. The latch plate buckle 44 may be movable, e.g., vertically, along the pillar 42 supporting the latch plate buckle 44. The latch plate buckle 44 is engageable with the latch plate 36 to secure the inflatable harness 26 relative to the vehicle body 40. The latch plate buckle 44 may include a latch, or any other suitable structure, to engage the latch plate 36. A user may insert the latch plate 36 into the latch plate buckle 44 to engage the latch plate 36 with latch plate buckle 44. The latch plate buckle 44 may include a button, actuator, etc., to disengage the latch plate 36 from the latch plate buckle 44, e.g., in response to input from the user.

An inflator 46, e.g., for inflating the inflatable harness 26, is supported by the vehicle body 40. The inflator 46 may be supported by one of the pillars 42. For example, the inflator 46 may be fixed to one of the pillars 42 via fasteners or other suitable structure. The inflator 46 may be supported by any other suitable structure of the vehicle 24. The inflator 46 may be, for example, a pyrotechnic inflator that uses a chemical reaction to drive inflation medium to the inflatable harness 26. The inflator 46 may be a cold gas inflator that stores compressed inflation medium such as compressed helium, argon, nitrogen, and/or any other suitable gas. The inflator 46 is in fluid communication with latch plate buckle 44 to provide inflation medium, e.g., to the fluid passage 38 of the latch plate 36 when the latch plate 36 is engaged with the latch plate buckle 44. The inflator 46 may be in fluid communication with the latch plate buckle 44, e.g., through various piping, etc. The inflator 46 may be directly connected to the latch plate buckle 44 to provide inflation medium.

An ISO-fix anchor 48 may be fixed to the vehicle body 40, e.g., via weld, fastener, or any other suitable structure. The ISO-fix anchor 48 enables secure attachment of, e.g., the inflatable harness 26, a child seat, etc., to the vehicle 24. The ISO-fix anchor 48 complies with ISOFIX (ISO 13216), the international standard for attachment points for child safety seats in passenger cars. ISOFIX may be referred to as LATCH ("Lower Anchors and Tethers for Children") in the United States, LUAS ("Lower Universal Anchorage System") or Canfix in Canada, and/or UCSSS ("Universal Child Safety Seat System"). For example, a pair of the ISO-fix anchors 48 may have a center-to-center distance of 280 millimeters. As another example, the ISO-fix anchor 48 may have a width of at least 25 millimeters. As one more example, the ISO-fix anchor 48 may have a diameter of 6 millimeters, with a tolerance of +/−0.1 millimeters. In addition to dimensional requirements, the ISO-fix anchor 48 may be designed to have a certain strength, e.g., to meet the ISOFIX standard.

The inflatable harness 26 is wearable by an animal 22, such as a dog, and may control kinematics of the animal 22 wearing the inflatable harness 26. For example, the first loop of webbing 28 may surround a neck of the animal 22 wearing the inflatable harness 26 and the second loop of webbing 30 may surround a torso of the animal 22. The panel 32 may be fixed to the first loop of webbing 28 and the second loop of webbing 30, e.g., via stitching or any suitable structure. The panel 32 of the inflatable harness 26 connects the first loop of webbing 28 to the second loop of webbing 30. The panel 32 may extend, e.g., along a chest of the animal 22 from the first loop of webbing 28 to the second loop of webbing 30. The inflatable harness 26, e.g., webbing of the first loop of webbing 28 and/or the second loop of webbing 30, may be formed of woven polyester, nylon, or any suitable material.

Figure 3:
FIG. 3 is a cross section of the inflatable tether of the assembly in an uninflated position taken along a line 3-3 of FIG. 1.
Figure 4:
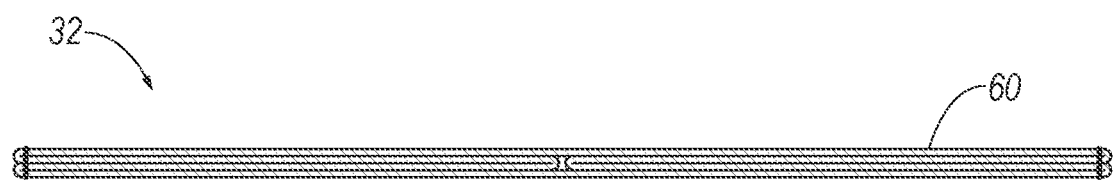
FIG. 4 is a cross section of a panel of the assembly in the uninflated position taken along a line 4-4 of FIG. 1.
Figure 5:
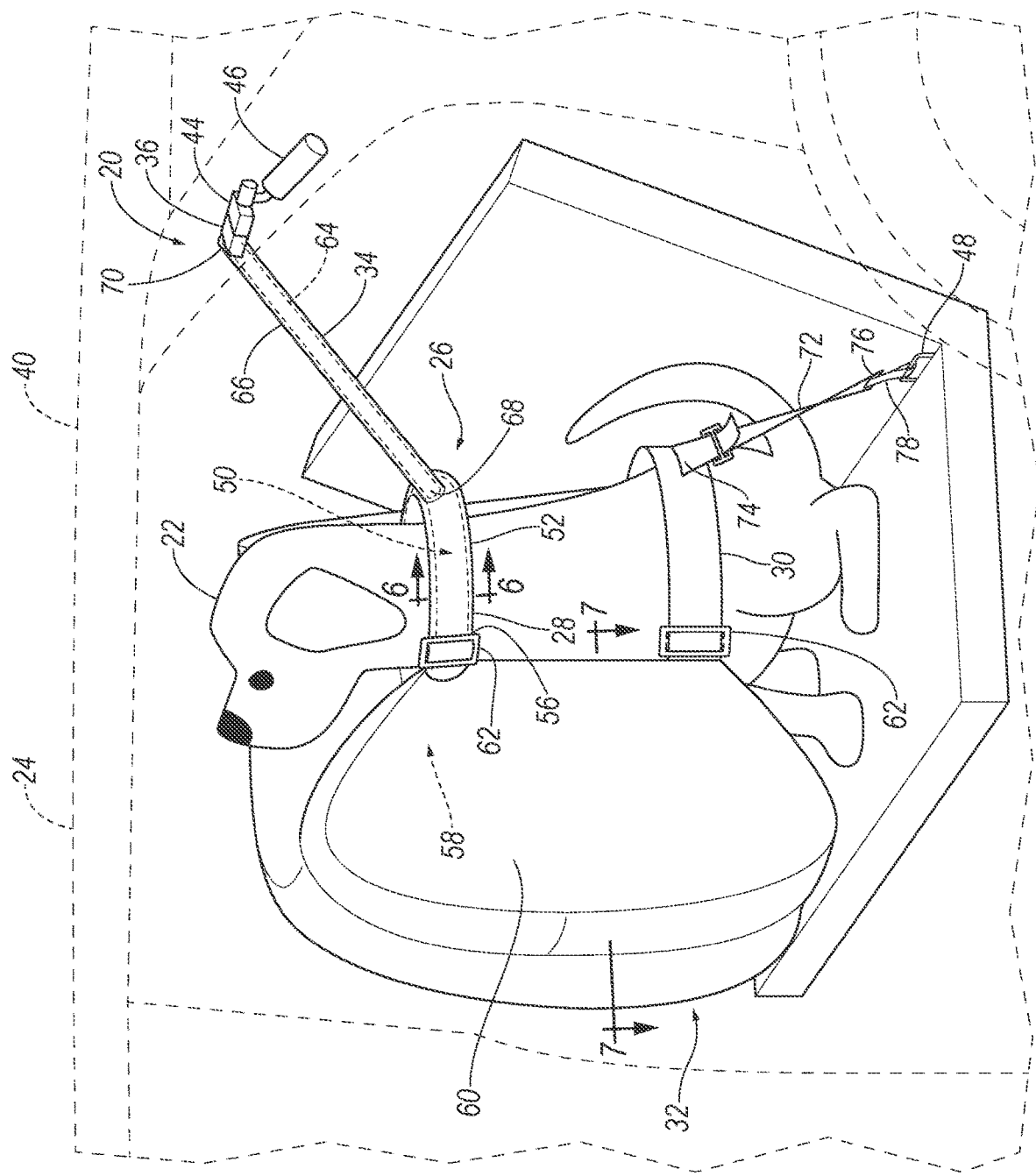
FIG. 5 is a perspective view of the assembly in an inflated position in the vehicle.
Figure 6:
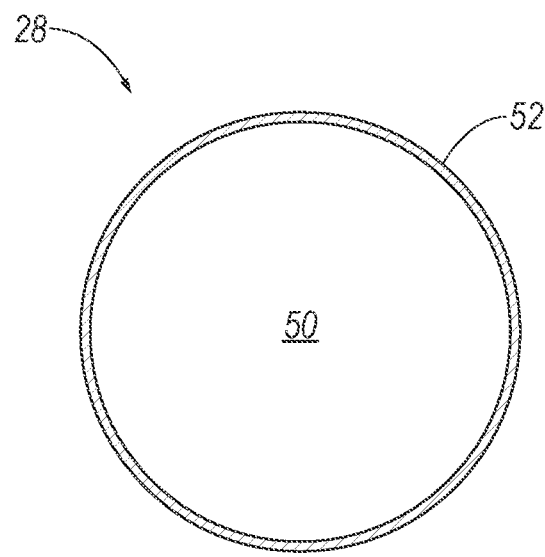
FIG. 6 is a cross section of the inflatable tether of the assembly in the inflated position taken along a line 6-6 of FIG. 5.
Figure 7:
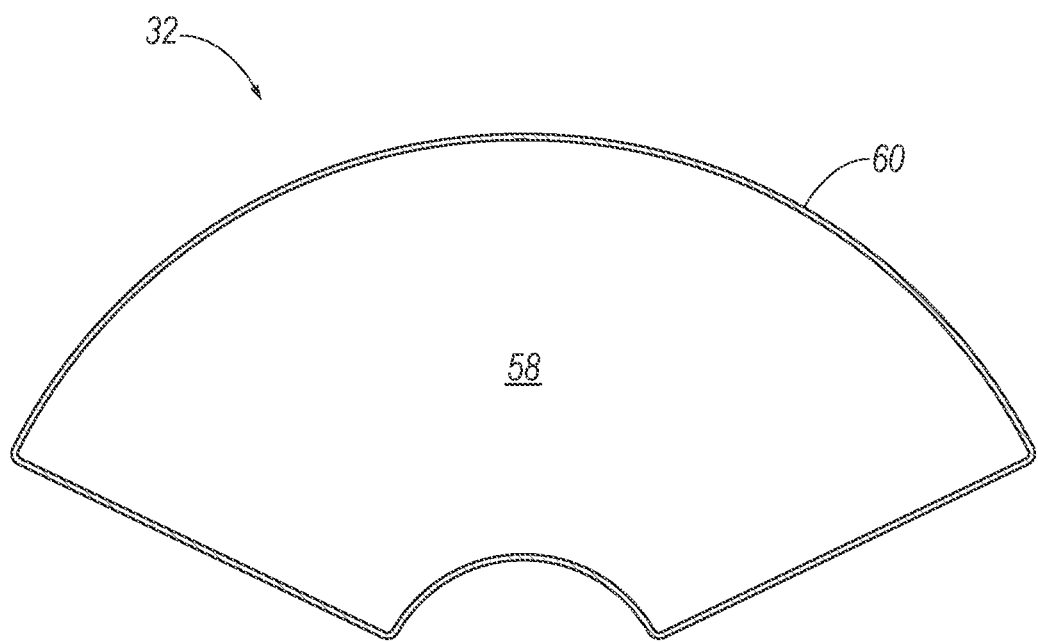
FIG. 7 is a cross section of the panel of the assembly in the inflated position taken along a line 7-7 of FIG. 5.

The inflatable harness 26 is inflatable from an uninflated position, shown in FIGS. 1-4, to an inflated position, shown in FIGS. 5-7. The inflatable harness 26 is inflated from the uninflated position to the inflated position, e.g., with inflation medium from the inflator 46. One or more components of the inflatable harness 26, e.g., first loop of webbing 28 and/or the panel 32, may receive the inflation medium.

The first loop of webbing 28 may be inflatable. In other words, the first loop of webbing 28 may define a webbing inflation chamber 50 that receives inflation medium and expands the first loop of webbing 28 from the uninflated position to the inflated position. The webbing of the first loop of webbing 28 may be generally flat in cross section in the uninflated position, as shown in FIG. 3, and generally circular in cross section in the inflated position, as shown in FIG. 6. The first loop of webbing 28 may include, for example, tubular webbing 52 that surrounds the webbing inflation chamber 50 therein. The webbing inflation chamber 50 may be continuous along the first loop of webbing 28, e.g., from an end 54 at one side of the panel 32 around the neck of the animal 22 wearing the harness to another end 56 an opposite side of the panel 32.

The panel 32 of the inflatable harness 26 may be inflatable. In other words, the panel 32 may define a panel inflation chamber 58 that receives inflation medium and expands the panel 32 from the uninflated position to the inflated position. For example, the panel 32 may include one or more sheets 60 of material that enclose the panel inflation chamber 58. As shown in FIG. 4, the sheets 60 of the panel 32 may be folded, e.g., with multiple layers overlaying and abutting each other, in the uninflated position. As shown in FIG. 7, the sheets 60 may be unfolded, and the panel 32 expanded in volume, in the inflated position. The panel 32 may include tear away stitching, straps, or the like that maintain shape of the panel 32 in the uninflated position. The tear away stitching, straps, or the like tears (or otherwise disconnects) upon inflation of the panel 32. The sheets 60 of the panel 32 that enclose the panel inflation chamber 58, may be woven fabric, e.g., a woven polymer yarn, strings, etc. As an example, the panel 32 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane. The panel 32 may be in fluid communication with the first loop of webbing 28. For example, the webbing inflation chamber 50 may be open to the panel inflation chamber 58 at the end 54 of the first loop of webbing 28.

The first loop of webbing 28 and/or the second loop of webbing 30 may be adjustable in size. In other words, circumferences of the first loop of webbing 28 and/or the second loop of webbing 30 may be adjustable to increase or decrease in length. For example, a webbing buckle 62 may be attached to the each of the first loop of webbing 28 and/or the second loop of webbing 30 and may enable the respective webbing to be secured into loop form. A user of the inflatable harness 26 may push and/or pull webbing through the webbing buckle 62 to adjust the size of the first loop of webbing 28 and/or the second loop of webbing 30. The webbing buckles 62 may be ladder lock buckles or any suitable type. Adjusting the size of the first loop of webbing 28 and/or the second loop of webbing 30 enables the inflatable harness 26 to be fit to various sized animals 22.

The inflatable tether 34 connects the inflatable harness 26 to the vehicle 24 and directs inflation medium from the inflator 46 to the inflatable harness 26. The inflatable tether 34 may define a tether passage 64. For example, the inflatable tether 34 may include tubular webbing 66 that surrounds the tether passage 64. The inflatable tether 34 extends from a proximate end 68 at the first loop of webbing 28 to a distal end 70 spaced from the inflatable harness 26. The tether passage 64 extends within the inflatable tether 34 from the proximate end 68 to the distal end 70. The inflatable tether 34 is in fluid communication with the inflatable harness 26 to provide inflation medium from the inflatable tether 34 to the inflatable harness 26. For example, the tether passage 64 may be open to the webbing inflation chamber 50 at the proximate end 68.

The latch plate 36 connects the inflatable harness 26 to the vehicle 24 and directs inflation medium from the inflator 46 to the inflatable tether 34, e.g., when engaged with the buckle. The latch plate 36 is fixed to the inflatable tether 34 at the distal end. The latch plate 36 may be fixed to the inflatable tether 34, e.g., via a fastener or other suitable structure. The latch plate 36 defines fluid passage 38. The fluid passage 38 extends within the latch plate 36 between opposite open ends. The fluid passage 38 of the latch plate 36 is in fluid communication with the inflatable tether 34 to provide inflation medium to the inflatable harness 26 from the fluid passage 38 of the latch plate 36. For example, the fluid passage 38 may be open to the tether passage 64. The fluid passage 38 is in fluid communication with the inflator 46 to receive inflation medium when the latch plate 36 is engaged with the latch plate buckle 44. For example, the fluid passage 38 may be open to tubing connecting the inflator 46 to the latch plate buckle 44 when the latch plate 36 is engaged with the latch plate buckle 44 or the fluid passage 38 may receive inflation medium directly from the inflator 46 when the latch plate 36 is engaged with the latch plate buckle 44.

A second tether 72 may extend from the second loop of webbing 30, e.g., from a proximate end 74 at the second loop of webbing 30 to a distal end 76 spaced from the inflatable harness 26. The second tether 72 may be fixed to the second loop of webbing 30, via stitching or other suitable structure. The second tether 72 may connect the inflatable harness 26 to the vehicle 24, e.g., to the ISO-fix anchor 48. For example, a clip 78 may be connected to the second tether 72. The clip 78 may include an open loop and flexible gate, the clip 78 may be "alligator" style defining a slot with a button actuated latch (not shown), etc. The clip 78 may be fixed to the distal end 76 of the second tether 72. As another example, the clip 78 may be slidably secured to the second tether 72 between the proximate end 74 and the distal end 76. The clip 78 may include a bar or other structure designed to inhibit movement of the clip 78 along the second tether 72 under specific loading conditions. The clip 78 may be configured to engage the ISO-fix anchor 48. In other words, the clip 78 may be configured for attachment to an anchor that meets ISOFIX standards. For example, the clip 78 may be configured to received and selectively engage an anchor having a certain diameter, e.g., 6 millimeters, with a tolerance of +/−0.1 millimeters. As another example, the clip 78 may have a width, e.g., of latches or other structure of the clip 78 that selectively engages the ISO-fix anchor 48, that are less than a certain amount, e.g., 25 millimeters.

Figure 8:
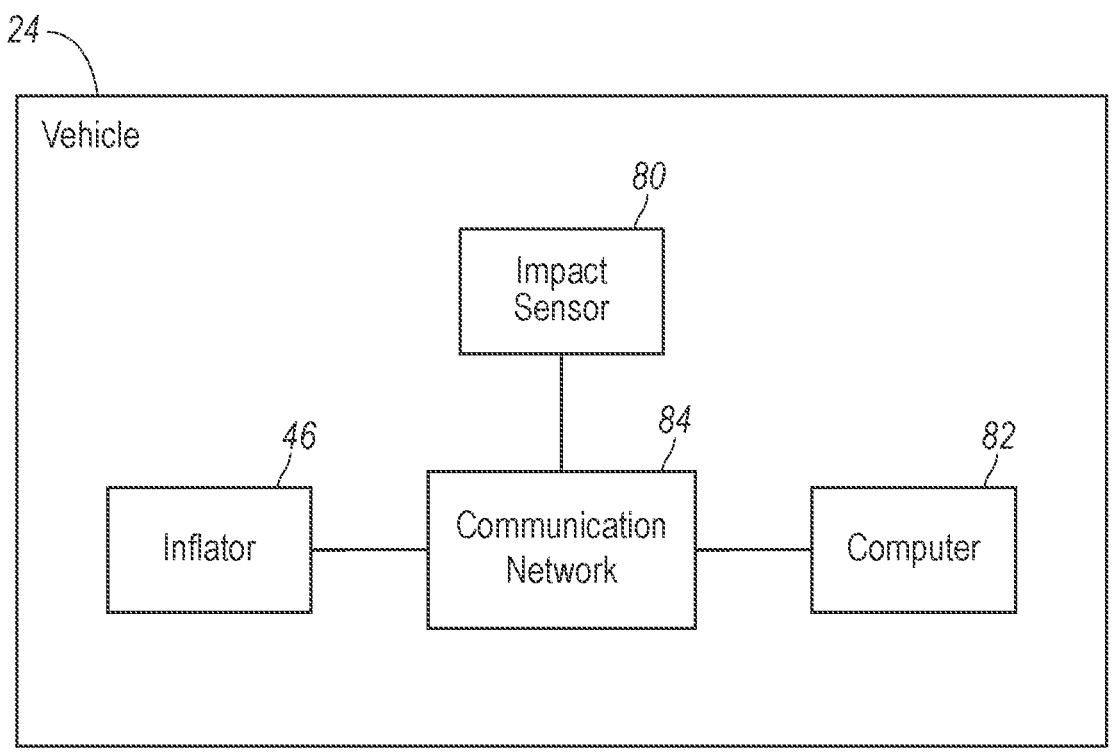
FIG. 8 is a block diagram of components of the vehicle.

With reference to FIG. 8, the vehicle 24 can include an impact sensor 80 that is configured to detect certain impacts to the vehicle 24. The impact sensor 80 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 80 may be located at numerous points in or on the vehicle 24.

The vehicle 24 may include a computer 82 to control inflation of the inflatable harness 26. The computer 82 is generally arranged for communications on a communication network 84 that can include a bus in the vehicle 24 such as a controller area network (CAN) or the like, and/or other wired and/or wireless mechanisms. Via the communication network 84, the computer 82 may transmit messages to various devices in the vehicle 24, and/or receive messages (e.g., CAN messages) from the various devices, e.g., the inflator 46, the impact sensor 80, etc. Alternatively or additionally, in cases where the computer 82 comprises a plurality of devices, the communication network 84 may be used for communications between devices represented as the computer 82 in this disclosure.

The computer 82 includes a processor and a memory. The memory includes one or more forms of computer 82 readable media, and stores instructions executable by the processor for performing various operations, processes, and methods, as disclosed herein. For example, the computer 82 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 82 may be a restraints control module. In another example, computer 82 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 82. The memory can be of any type, e.g., hard disk drives, solid state drives, servers, or any volatile or non-volatile media. The memory can store the collected data sent from the sensors.

The computer 82 may be programmed to, i.e., the instructions stored in memory may be executable by the processor to, inflate the inflatable harness 26 in response to detecting certain impacts to the vehicle 24. The computer 82 may detect certain impacts based on data from the impact sensor 80, e.g., received via the communication network 84. Upon detecting the certain impacts, the computer 82 may command the inflator 46 to inflate the inflatable harness 26, e.g., controlling kinematics of the animal 22 wearing the inflatable harness 26. The computer 82 may command the inflator 46 by sending a command via the communication network 84.

In the drawings, the same reference numbers indicate the same elements. With regard to the media, processes, systems, methods, etc., described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

The adjectives "first" and "second" are used throughout this document as identifiers and do not signify importance, order, or quantity.

Computer executable instructions may be compiled or interpreted from computer programs created using a variety of programming languages and/or technologies, including, without limitation, and either alone or in combination, Java, C, C+, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly, comprising:
   an inflatable harness having a first loop of webbing, a second loop of webbing, and a panel connecting the first loop of webbing to the second loop of webbing;
   an inflatable tether extending from the first loop of webbing, the inflatable tether in fluid communication with the inflatable harness; and
   a latch plate fixed to the inflatable tether, the latch plate defining a fluid passage in fluid communication with the inflatable tether to provide inflation medium to the inflatable harness.

2. The assembly of claim 1, wherein the first loop of webbing is inflatable.

3. The assembly of claim 1, wherein the panel is inflatable.

4. The assembly of claim 1, wherein the first loop is adjustable in size.

5. The assembly of claim 1, wherein the second loop is adjustable in size.

6. The assembly of claim 1, further comprising a second tether extending from the second loop.

7. The assembly of claim 6, further comprising a clip connected to the second tether.

8. The assembly of claim 7, wherein the clip is configured to engage an ISO-fix anchor.

9. An assembly, comprising:
   a vehicle body,
   a buckle supported by the vehicle body;
   an inflator supported by the vehicle body;
   a latch plate engaged with the buckle, the latch plate defining a fluid passage, the fluid passage in fluid communication with the inflator to receive inflation medium;
   an inflatable harness having a first loop of webbing, a second loop of webbing, and a panel connecting the first loop of webbing to the second loop of webbing; and
   an inflatable tether extending from the first loop of webbing, the latch plate fixed to the inflatable tether, the inflatable tether in fluid communication with the inflatable harness and the fluid passage of the latch plate to provide inflation medium to the inflatable harness from the fluid passage of the latch plate.

10. The assembly of claim 9, wherein the vehicle body includes a pillar, and wherein the buckle is supported by the pillar.

11. The assembly of claim 10, wherein the inflator is supported by the pillar.

12. The assembly of claim 9, wherein the inflator is a cold gas inflator.

13. The assembly of claim 9, wherein the first loop of webbing is inflatable.

14. The assembly of claim 9, wherein the panel is inflatable.

15. The assembly of claim 9, wherein the first loop is adjustable in size.

16. The assembly of claim 9, wherein the second loop is adjustable in size.

17. The assembly of claim 9, further comprising a second tether extending from the second loop to a second distal end.

18. The assembly of claim 17, further comprising a clip connected to the second tether.

19. The assembly of claim 18, further comprising an ISO-fix anchor fixed to the vehicle body and wherein the clip is configured to engage the ISO-fix anchor.

* * * * *